United States Patent
Prince et al.

(10) Patent No.: US 10,905,995 B2
(45) Date of Patent: Feb. 2, 2021

(54) METHOD FOR PRODUCING BIOMETHANE BY PURIFYING BIOGAS FROM NON-HAZARDOUS WASTE STORAGE FACILITIES AND FACILITY FOR IMPLEMENTING THE METHOD

(71) Applicant: WAGA ENERGY, Meylan (FR)

(72) Inventors: Guénaël Prince, Saint Egreve (FR); Mathieu Lefebvre, Saint-Nazaire les Eymes (FR); Pierre Briend, Seyssinet Pariset (FR); Nicolas Paget, Saint Martin d'heres (FR)

( * ) Notice: Subject to any disclaimer, the term of this patent is extended or adjusted under 35 U.S.C. 154(b) by 248 days.

(21) Appl. No.: 16/065,644

(22) PCT Filed: Nov. 10, 2016

(86) PCT No.: PCT/FR2016/052937
§ 371 (c)(1),
(2) Date: Jun. 22, 2018

(87) PCT Pub. No.: WO2017/109305
PCT Pub. Date: Jun. 29, 2017

(65) Prior Publication Data
US 2019/0001263 A1    Jan. 3, 2019

(30) Foreign Application Priority Data

Dec. 24, 2015   (FR) ..................... 15 63357

(51) Int. Cl.
*B01D 53/22* (2006.01)
*B01D 53/04* (2006.01)
(Continued)

(52) U.S. Cl.
CPC ......... *B01D 53/228* (2013.01); *B01D 53/002* (2013.01); *B01D 53/047* (2013.01);
(Continued)

(58) Field of Classification Search
CPC .... B01D 53/22; B01D 53/228; B01D 53/022; B01D 53/0462; B01D 53/047; F25J 3/0209; F25J 3/0233
See application file for complete search history.

(56) References Cited

U.S. PATENT DOCUMENTS 3,989,478 A    11/1976   Jones
5,486,227 A     1/1996   Kumar et al.
(Continued)

FOREIGN PATENT DOCUMENTS

EP    0772665 A1    5/1997
EP    1979446 A2   10/2008
(Continued)

OTHER PUBLICATIONS

International Search Report issued in PCT/FR2016/052937 dated Mar. 13, 2017.
(Continued)

*Primary Examiner* — Youngsul Jeong
(74) *Attorney, Agent, or Firm* — Marshall, Gerstein & Borun LLP

(57) ABSTRACT

A method for producing biomethane by purifying biogas from non-hazardous waste storage facilities involves compressing the initial gas flow, introducing the gas flow to be purified into at least one adsorber loaded with adsorbents capable of reversibly adsorbing the VOCs, and subjecting the VOC-depleted gas flow to at least one membrane separation step in order to partially separate the $CO_2$ and $O_2$ from the gas flow. The method also involves introducing the retentate from the membrane separation step into at least one adsorber loaded with adsorbents capable of reversibly adsorbing the major portion of the remaining $CO_2$, subjecting the $CO_2$-depleted gas flow exiting the adsorber loaded with adsorbents capable of reversibly adsorbing the major portion of the remaining $CO_2$ to a cryogenic separation step
(Continued)

in a distillation column in order to separate the $O_2$ and $N_2$ from the gas flow, and recovering the $CH_4$-rich flow from the cryogenic separation step.

3 Claims, 1 Drawing Sheet

(51) Int. Cl.
*B01D 53/00* (2006.01)
*B01D 53/047* (2006.01)
*F25J 3/02* (2006.01)
*C10L 3/08* (2006.01)
*C10L 3/10* (2006.01)

(52) U.S. Cl.
CPC ............ *B01D 53/0462* (2013.01); *C10L 3/08* (2013.01); *C10L 3/101* (2013.01); *F25J 3/0209* (2013.01); *F25J 3/0233* (2013.01); *F25J 3/0257* (2013.01); *B01D 2256/245* (2013.01); *B01D 2257/102* (2013.01); *B01D 2257/104* (2013.01); *B01D 2257/504* (2013.01); *B01D 2257/708* (2013.01); *B01D 2258/05* (2013.01); *B01D 2259/40001* (2013.01); *C10L 3/104* (2013.01); *C10L 3/105* (2013.01); *C10L 2290/46* (2013.01); *C10L 2290/541* (2013.01); *C10L 2290/543* (2013.01); *C10L 2290/548* (2013.01); *F25J 2200/02* (2013.01); *F25J 2200/70* (2013.01); *F25J 2200/74* (2013.01); *F25J 2205/40* (2013.01); *F25J 2205/60* (2013.01); *F25J 2205/66* (2013.01); *F25J 2205/70* (2013.01); *F25J 2205/80* (2013.01); *F25J 2210/04* (2013.01); *F25J 2210/42* (2013.01); *F25J 2210/66* (2013.01); *F25J 2220/66* (2013.01); *F25J 2230/04* (2013.01); *F25J 2230/30* (2013.01); *F25J 2245/02* (2013.01); *F25J 2260/02* (2013.01); *F25J 2270/904* (2013.01); *Y02C 20/40* (2020.08)

(56) References Cited

U.S. PATENT DOCUMENTS

| | | | |
|---|---|---|---|
| 5,669,958 | A | 9/1997 | Baker et al. |
| 5,964,923 | A | 10/1999 | Lokhandwala |
| 8,221,524 | B2 | 7/2012 | Mitariten |
| 8,784,534 | B2 * | 7/2014 | Kamakoti ............... C10L 3/103 95/97 |
| 2004/0103782 | A1 | 6/2004 | Wascheck et al. |
| 2010/0077796 | A1 | 4/2010 | Gadre et al. |

FOREIGN PATENT DOCUMENTS

| | | | |
|---|---|---|---|
| FR | 2917489 A1 | 12/2008 | |
| FR | 2971331 A1 | 8/2012 | |
| WO | WO-2011/097162 A1 | 8/2011 | |
| WO | WO-2011097162 A1 * | 8/2011 | ........... B01D 53/228 |
| WO | WO-2013/052325 A1 | 4/2013 | |
| WO | WO-2013052325 A1 * | 4/2013 | ........... B01D 53/047 |

OTHER PUBLICATIONS

International Preliminary Report on Patentability issued in PCT/FR2016/052937 dated Mar. 14, 2018.

* cited by examiner

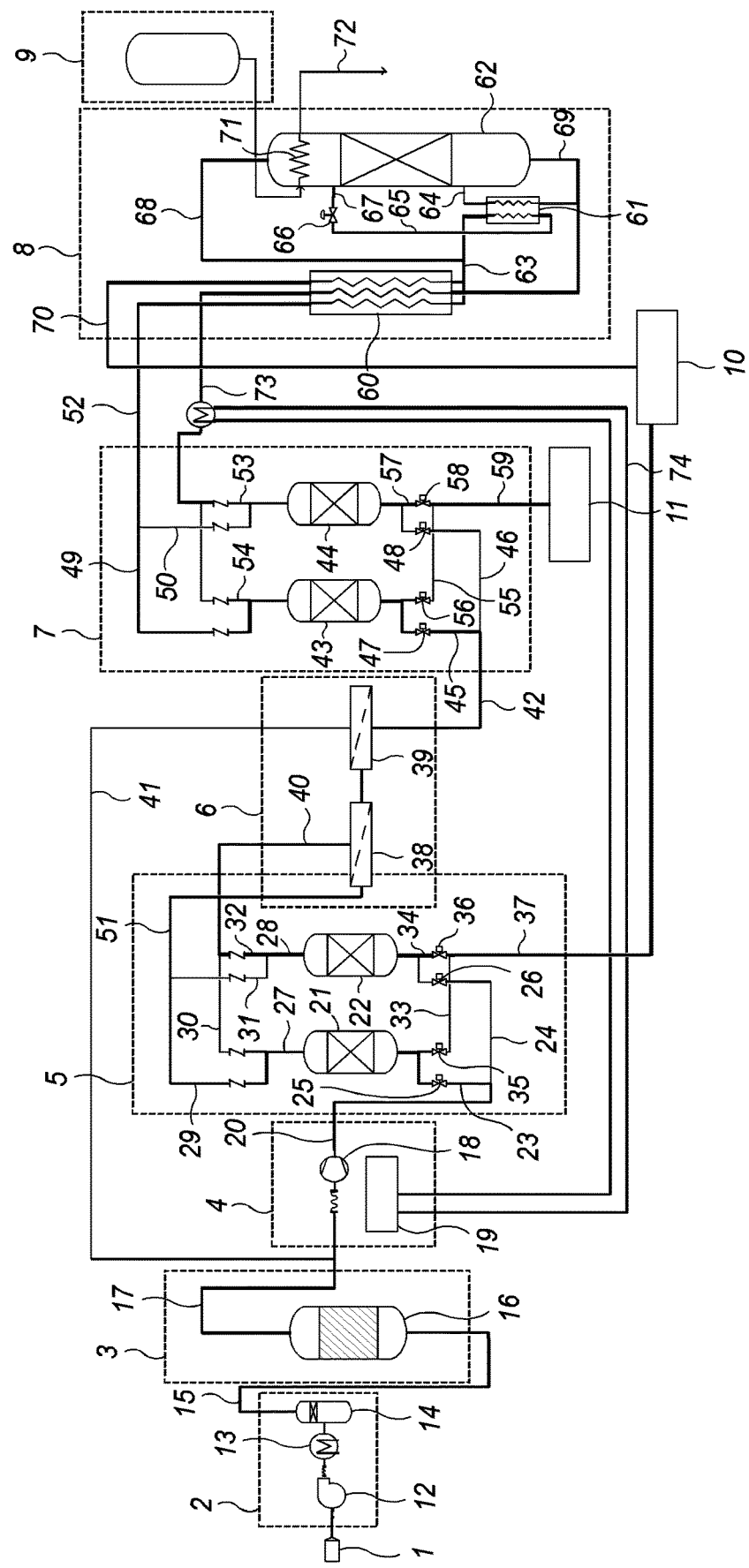

METHOD FOR PRODUCING BIOMETHANE BY PURIFYING BIOGAS FROM NON-HAZARDOUS WASTE STORAGE FACILITIES AND FACILITY FOR IMPLEMENTING THE METHOD

TECHNOLOGICAL FIELD

This disclosure relates to a method for producing biomethane by purifying biogas from non-hazardous waste storage facilities (NHWSF). It also relates to a facility for implementing such a method. More precisely, the present disclosure relates to a processing method by coupling a membrane permeation and a cryogenic distillation of a gas flow containing at least methane, carbon dioxide, atmospheric gases (nitrogen and oxygen) and pollutants (Hydrogen sulfide ($H_2S$) and volatile organic compounds (VOCs)). The objective is to produce a methane-rich gaseous current whose methane content meets the needs of its use and to limit as far as possible the impact of methane ($CH_4$) emissions in the atmosphere (strong greenhouse gas). The disclosure relates in particular to the purification of biogas from non-hazardous waste storage facilities, hereinafter NHWSF (Non-Hazardous Waste Storage Facilities), in order to produce biomethane compliant with injecting into a natural gas network or for local use as a vehicle fuel.

BACKGROUND

Anaerobic digestion of organic waste present in NHWSF produces a significant quantity of biogas throughout the entire operational life of the NHWSF and even several years after ceasing operation and closure of the NHWSF. Because of its principal constituents—methane and carbon dioxide—biogas is a powerful greenhouse gas; in parallel, in the context of depletion of fossil fuels, is it also an appreciable renewable energy source.

Biogas contains several polluting compounds and must be purified in order to be commercially valuable. There are several methods enabling the recovery and purification of biogas.

Biogas contains predominantly methane ($CH_4$) and carbon dioxide ($CO_2$) in variable proportions, which depend on the method by which it is obtained. In the case of biogas from NHWSF, the gas further contains a proportion of atmospheric gases (nitrogen and oxygen) and to a lesser extent, water, hydrogen sulfide, and volatile organic compounds (VOCs).

Depending on the degraded organic matter, the techniques used and the particular conditions (climate, typology, etc.) of each NHWSF, the proportions of the components of the biogas differ. Nevertheless, on average, biogas comprises, based on dry gas, from 30 to 60% methane, from 15% to 50% $CO_2$, from 0 to 30% nitrogen, from 0 to 6% oxygen, from 0 to 1% $H_2S$ and a few tens to a few thousand milligrams of VOCs per normal cubic meter and a number of other impurities in trace amounts.

Biogas is upgraded in different ways. It can, after partial treatment, be upgraded near to the production site to supply heat, electricity or both combined (cogeneration). The significant carbon dioxide content reduces its calorific power, increases costs of compression and transport and limits economic interest in its development to this nearby use.

Further purification of biogas enables its wider use. In particular, significant purification of biogas enables a purified biogas to be obtained with the specifications of natural gas and which may be substituted for it. Biogas purified in this way is known as "biomethane". Biomethane thus adds to natural gas resources with a renewable portion produced regionally. It can be used for exactly the same purposes as natural gas from fossil fuel origins. It can supply a natural gas network or vehicle filling stations. It may also be liquefied to be stored and transported in the form of liquefied natural gas (LNG).

The methods for recovering biomethane are determined according to local contexts: local energy requirements, possibilities of exploiting as biomethane fuel, existence of nearby natural gas distribution or transport networks in particular. Creating synergies between the various stakeholders operating in a region (farmers, manufacturers, public authorities), the production of biomethane helps regions to gain greater energy independence.

It should be noted that, depending on the country, environmental regulations often impose restrictions regarding atmospheric emissions. It is indeed necessary to implement technologies that can limit the impacts of the greenhouse gases ($CH_4$) and pollutants ($H_2S$ and VOCs) contained in biogas. It is therefore important to have a high yield of $CH_4$ (equal, by weight, to the quantity of $CH_4$ recovered based on the quantity of $CH_4$ contained in the biogas) and to provide treatment systems for $H_2S$ and VOCs that avoid atmospheric emissions.

Furthermore, an additional issue remains the presence of $O_2$, which, during the separation of the mixture, can generate an explosive atmosphere during the various enrichment stages. This risk of creating an explosive mixture makes landfill biogas particularly difficult to purify in a safe and economic manner.

Document U.S. Pat. No. 8,221,524 B2 describes a method for the enrichment of $CH_4$ in a gas to 88% by various recycling steps. The method consists of compressing the gas flow, then passing it over an adsorbent to remove the VOCs. The gas flow is then subjected to a membrane separation step then to a pressure swing adsorption (PSA) step. The adsorbent used in the PSA is of the CMS (carbon molecular sieve) type and enables $N_2$ and a small amount of $O_2$ to be removed.

Document EP1979446 describes a biogas purification method consisting of removing $H_2S$, compressing the gas, and filtering it to remove particles. The gas is then subjected to a membrane separation step to remove $CO_2$ and $O_2$, drying by passing through a PSA then into various filters then finally into a PSA again to remove $N_2$. The gas is finally liquefied.

Document US2004/0103782 describes a biogas purification method consisting of removing $H_2S$, compressing the gas, filtering it to remove particles, subjecting it to a pressure swing adsorption (PSA) step to remove VOCs, then to a membrane separation to remove the majority of $CO_2$ as well as a fraction of $O_2$.

Document U.S. Pat. No. 5,486,227 describes a purification and liquefaction method for a gaseous mixture consisting of subjecting the flow to temperature swing adsorption (TSA) to remove notably $H_2S$, then to pressure swing adsorption (PSA) to remove notably $CO_2$, then finally to a cryogenic separation to remove nitrogen and to retain only methane.

Documents U.S. Pat. Nos. 5,964,923 and 5,669,958 describe a treatment method for a gaseous effluent consisting of dehydrating the gas, condensing it by passing it through an exchanger, subjecting the gas to membrane separation, then to cryogenic separation.

Document US2010/077796 describes a purification method consisting of subjecting the gas flow to membrane separation, treating the permeate in a distillation column, then mixing the methane gas from the column, after vaporization, with the retentate obtained at the end of membrane separation.

Documents U.S. Pat. No. 3,989,478 and FR2917489 describe cryogenic systems for the purification of a methane-rich flow. These two systems use a PSA to remove the $CO_2$, before the liquefaction step. In document U.S. Pat. No. 3,989,478, the regeneration of the PSAs is carried out by way of the nitrogen-rich distillate collected at the head of the distillation column. In document FR2917489, the regeneration of the PSA is carried out by the liquid methane drawn off at the bottom of the distillation column.

Document EP0772665 describes the use of a cryogenic distillation column to separate mine gas composed mainly of $CH_4$, $CO_2$ and $N_2$.

Document WO 2013/052325 A1 describes a method for producing methane combining a VOC purification step using a PSA, then a $CO_2$ separation step using a TSA and finally a cryogenic distillation step enabling the $O_2$ and $N_2$ to be removed. The membrane separation referred to is a membrane separation enabling the $CO_2$ to be removed and is thus substituted for the TSA. It does not enable $O_2$ to be removed and therefore does not resolve the problem of explosiveness in the distillation column.

Document WO 2011/097162 A1 describes a method for producing biomethane containing at least three steps, which are the removal of VOCs using a PSA, the removal of $CO_2$ using a membrane and the removal of residual $CO_2$ using a TSA. The TSA is further followed by a liquefaction unit. No purification of $O_2$ is provided, particularly since the purified gas is directly treated in a liquefaction unit.

Document FR 2971331 A1 describes the possibility of using cryogenic distillation to separate atmospheric gases from methane and thus decreasing the risks linked to the presence of oxygen.

None of the documents cited solves the problem of providing biomethane without risk linked to $O_2$, with a methane concentration greater than 95%, a $CO_2$ concentration of less than 2.5% and with a methane yield greater than 85%.

SUMMARY OF THE DISCLOSURE

The problem that the disclosed embodiments propose to solve is that of providing a method of purifying biogas respecting the constraints above, that is to say a method which is safe, with an optimal yield, producing high quality biomethane which can be substituted for natural gas and which respects environmental standards relating notably to the destruction of polluting compounds such as VOCs and compounds having a strong greenhouse effect such as $CH_4$. The gas thus produced could be upgraded in liquid or gaseous form either injected into a gas network or for mobility applications.

To resolve this problem, the Applicant has coupled 4 technologies, respectively purification of VOCs by way of PSA, a first $CO_2$ and $O_2$ purification step by way of a membrane separation, a second $CO_2$ purification step by way of PTSA and finally an $N_2$ and $O_2$ purification step by way of cryogenic separation.

More precisely, the subject of the disclosure is a method for producing biomethane by purifying biogas from non-hazardous waste storage facilities (NHWSF) wherein:
the initial gas flow is compressed,
the gas flow to be purified is introduced into at least one adsorber, advantageously a pressure swing adsorber (PSA) loaded with adsorbents capable of reversibly adsorbing the VOCs,
the VOC-depleted gas flow exiting the PSA is submitted to at least one membrane separation to partially separate the $CO_2$ and $O_2$ from the gas flow,
the retentate from the membrane separation is introduced into at least one adsorber, advantageously a pressure and temperature swing adsorber (PTSA) loaded with adsorbents capable of reversibly adsorbing the majority of the remaining $CO_2$,
the $CO_2$-depleted gas flow exiting the PTSA is subjected to a cryogenic separation in a distillation column to separate the $O_2$ and the $N_2$ from the gas flow,
the $CH_4$-rich flow from the cryogenic separation is collected.

According to an alternative embodiment and in the remainder of the description, the PTSA may be substituted by an adsorber regenerated by removal under vacuum or reduced pressure.

In a preferred embodiment, the PSA is regenerated by means of the permeate from a first membrane separation. Likewise, the PTSA is regenerated by means of the $CH_4$-rich flow or $N_2$-rich distillate from the cryogenic separation. The permeate from a second membrane separation is oxidized after having optionally mixed it with the nitrogen-rich distillate from the cryogenic separation.

Advantageously, before the compression, the gas to be purified is dried and then subjected to a desulfurization step.

The drying step consists of pressurizing the gas from 20 to a few hundred hectopascals (500 hPa (from 20 to a few hundred millibars (500 mbar)) relative maximum), further preventing air from entering the pipework. The pressurizing enables a preliminary drying to be carried out by cooling the biogas to between 0.1 and 10° C., to condense the water vapor. The gas flow exiting therefore has a pressure of between 20 and 500 hPa (between 20 and 500 mbar) and a dew point of between 0.1° C. and 10° C. at the outlet pressure.

The desulfurization step enables the capture of $H_2S$ in order to meet the quality requirements of the network and to avoid a too rapid degradation of the materials in the remainder of the process. Furthermore, it is important to have a capture step which fixes the $H_2S$ in a stable form (such as solid sulfur) to avoid any emissions harmful to health or the environment (olfactory nuisance, formation of SOx). This treatment is carried out preferably with activated charcoal or iron hydroxides in vessels suitably sized for the quantity of $H_2S$ to be treated. $H_2S$ is thus transformed into solid sulfur. The gas flow exiting contains in practice less than 5 mg/Nm³ of $H_2S$.

According to the method, the gas to be processed is then compressed. The compression is carried out at a pressure of between 0.8 and 2.4 megapascals (between 8 and 24 bars). This pressure is necessary to enable the subsequent steps to be carried out and to decrease the equipment size. The compression advantageously takes place with a lubricated screw compressor. Using this type of compressor gives the possibility of optionally collecting the heat on the oil cooling circuit. In a preferred embodiment and as will be seen in the remainder of the document, the heat is collected to heat the gas which will be used to regenerate the PTSA.

The next step consists of purifying the gas flow from VOCs. In order to do this, the gas flow to be purified is passed over at least one pressure swing adsorber (PSA) loaded with adsorbents capable of reversibly adsorbing the VOCs. This step enables the biogas to be purified from VOCs (light hydrocarbons, mercaptans, siloxanes, etc.), which are incompatible with the quality requirements of the network, and which risk polluting the next steps of the purification (notably the membranes).

Advantageously, two PSAs are used so as to be able to implement the process continuously. Indeed, when the first PSA is saturated with VOCs, it is substituted by the second PSA which has itself been previously regenerated.

Preferably, the PSA(s) is/are regenerated by the permeate from the membrane separation. This permeate is composed mainly of $CO_2$ and has a very low $CH_4$ content. In practice, the gas flow at the regeneration outlet is oxidized. In an advantageous embodiment, it is mixed in advance with the $N_2$-rich distillate from the cryogenic separation, the mixture then being oxidized. Alternatively, the gas flow at the PSA regeneration outlet and the $N_2$-rich distillate from the cryogenic separation are oxidized separately.

In the next step of the method, the $CO_2$ is removed from the gas flow. To do this, the VOC-depleted gas flow exiting the PSA is subjected to at least one membrane separation to partially separate the $CO_2$ and $O_2$ from the gas flow. More precisely, the selective membrane separation enables a first effective purification of the biogas to be performed by separating a large part of the $CO_2$ (more than 90%) as well as some of the $O_2$ (around 50% and generally at least 30%, advantageously between 30 and 70%). The performances of membrane separation vis-a-vis $CO_2$ and $O_2$ will depend on the permeability of the membrane vis-a-vis these gases. A person skilled in the art will be able to select the membrane fulfilling the above objectives. In particular, advantageously, polyimide membranes will be chosen. Membrane purification may be composed of 1, 2, 3 or 4 membrane stages depending on the characteristics of the biogas. This step enables a gas with less than 3% $CO_2$ and with a $CH_4$ yield greater than 90% to be produced.

In a particular embodiment, two successive membrane separations are carried out. More specifically:
  the VOC-depleted gas flow exiting the PSA is subjected to a first membrane separation,
  the PSA is regenerated by means of the permeate from said first membrane separation,
  the retentate from the first separation is subjected to a second membrane separation,
  the permeate from the second membrane separation is reintroduced upstream of the compression.

Recirculating the permeate from the second membrane separation, which still contains $CO_2$ and $CH_4$, thus improves the yield of $CH_4$. In practice, the permeate is reintroduced between the desulfurization vessel and the compressor.

The next step in the process consists of carrying out an additional purification of the $CO_2$ still present in the gas flow. Indeed, membrane separation alone is not sufficient to reach a $CO_2$ content in the purified gas of 50 ppm before the cryogenic separation step. The value of 50 ppm constitutes the limit value above which there is a risk of forming $CO_2$ crystals, which may block the cryogenic exchangers.

This step is carried out by a PTSA. The choice of a PTSA enables the size of the vessel and the cycle times to be reduced.

The adsorbent will notably be selected from the group comprising zeolites.

Advantageously, 2 PTSAs are used so as to be able to implement the process continuously. Indeed, when the first PTSA is saturated with $CO_2$, it is substituted by the second PTSA which has itself been previously regenerated.

The way of regenerating the PTSAs depends on the liquid or gaseous nature of the final methane-rich, upgraded product.

When the method aims to upgrade methane in liquid form, the PTSA(s) may be regenerated by means of a nitrogen flow resulting from the vaporization of an external source of liquid nitrogen. The vapor is in this case produced by cooling the $CO_2$-depleted gas flow, exiting the PTSA. This embodiment although being able to be implemented, is not optimal as it requires an additional source of liquid nitrogen.

The method finds additional interest when it aims to produce methane in gaseous form. Under these conditions:
  the $CH_4$-rich flow from the cryogenic separation is vaporized,
  the PTSA(s) is/are regenerated using a vaporized $CH_4$-rich gas flow.

Whether within the scope of producing liquid methane or gaseous methane, another alternative consists of regenerating the PTSA(s) by the $N_2$-rich distillate from the cryogenic separation, where this distillate may be mixed with vaporized nitrogen used for cooling the head of the column by vaporization of liquid nitrogen coming from an external source.

Advantageously, the heat generated by compressing the initial gas flow is collected to preheat the gas flow used for regenerating the PTSA. The preheating thus enables the temperature of the gas flow to be increased by 30 to 40° C. to a value of 80 to 90° C.

The PTSA regeneration flow may therefore be the vaporized $CH_4$-rich gas flow or the $N_2$-rich distillate from the cryogenic separation, the latter being optionally mixed in the column with the vaporized nitrogen used for cooling the head of the column.

The PTSAs are dimensioned so as to avoid the biomethane produced containing more than 2.5% $CO_2$ in order to guarantee a quality compatible with the requirements for commercialization.

The next step of the method consists of separating the nitrogen and the $O_2$ then collecting the $CH_4$-rich flow resulting from this separation. To do this, the $CO_2$-depleted gas flow exiting the PTSA is subjected to a cryogenic separation in a distillation column.

In a first embodiment, the final product, i.e., the methane-rich flow, is collected in liquid state.

Under these conditions:
  the $CO_2$-depleted gas flow is cooled,
  the cooled flow is sent to the distillation column,
  the methane-rich liquid is drawn off the distillation column.

The flow is cooled within a heat exchanger with contact with an external source of liquid nitrogen for example.

In a second embodiment, the final product, i.e., the methane-rich flow, is collected in gaseous state.

Under these conditions:
  the $CO_2$-depleted gas flow is cooled by heat exchange with the liquid $CH_4$ drawn off the distillation column,
  the resulting cooled gas flow is sent to the distillation column,
  the methane-rich liquid is drawn off the distillation column,
  the methane-rich liquid is vaporized by heat exchange with the $CO_2$-depleted gas flow coming from the PTSA.

Another embodiment is a facility for producing biomethane by purifying biogas from non-hazardous waste storage facilities (NHWSF) implementing the method described above.

In a particular embodiment, the installation comprises:
a biogas source,
a compressor capable of compressing the biogas to a pressure of 0.8 and 2.4 megapascals (8 and 24 bars),
2 adsorbers, advantageously PSA loaded with adsorbents capable of reversibly adsorbing VOCs,
2 separating membrane stages capable of partially separating the $CO_2$ and the $O_2$ from the gas flow,
2 adsorbers, advantageously PTSAs loaded with adsorbents capable of reversibly adsorbing the majority of the $CO_2$ remaining in the gas flow,
a heat exchanger capable of cooling the $CO_2$-depleted gas flow,
a distillation column.

The elements constituting the facility are in fluid communication by means of appropriate pipework.

BRIEF DESCRIPTION OF THE DRAWING

The contemplated embodiments and resulting benefits will become clear from the following example supported by the attached FIGURE.

The FIGURE is a schematic representation of a facility according to a particular embodiment.

DETAILED DESCRIPTION

According to this particular embodiment, the method aims to produce gaseous biomethane while optimizing the energy expenditure as much as possible.

The facility comprises a source of biogas to be treated (1), a drying unit (2), a desulfurization unit (3), a compression unit (4), a VOC purification unit (5), a first $CO_2$ purification unit (6), a second $CO_2$ purification unit (7), a cryodistillation unit (8), a liquid nitrogen storage unit (9), an oxidation unit (10) and finally a methane gas recovery unit (11). All the apparatus are connected to each other by pipes.

The drying unit (2) comprises a pressurizer (12), a heat exchanger (13) and a separating jar (14). As already mentioned, this step enables the gas to be pressurized from 20 to a few hundred hectopascals (500 hPa (from 20 to a few hundred millibars (500 mbar) relative maximum). Cooling the gas to between 0.1 and 10° C. enables it to be dried. The gas flow exiting (15) therefore has a pressure of between 20 and 500 hPa (between 20 and 500 mbar) and a dew point of between 0.1° C. and 10° C. at the outlet pressure.

The desulfurization unit (3) is in the form of a tank (16) loaded with activated charcoal or iron hydroxides. This unit enables the $H_2S$ to be captured and transformed into solid sulfur. The flow of gas exiting (17) contains in practice less than 5 mg/Nm³ of $H_2S$.

The compression unit (4) is in the form of a lubricated screw compressor (18). This compressor compresses the gas flow (17) to a pressure of between 0.8 and 2.4 megapascals (between 8 and 24 bars). The unit further comprises a module (19) for recovering the heat generated by the oil cooling circuit. The flow leaving is shown on the FIGURE by reference (20).

The VOC purification unit (5) comprises 2 PSAs (21, 22). They are loaded with adsorbents specifically selected to allow adsorption of the VOCs, and the later desorption during regeneration. The PSAs function in production and regeneration mode alternately.

In production mode, the PSAs (21, 22) are supplied with gas flow at their lower part. The pipe in which the gas flow (20) circulates splits into two pipes (23, 24), each equipped with a valve (25, 26) and supplying the lower part of the first PSA (21) and the second PSA (22) respectively. The valves (25, 26) will be alternately closed depending on the saturation level of the PSAs. In practice, when the first PSA is saturated with VOCs, valve (25) is closed and valve (26) is opened to start loading the second PSA (22). From the upper part of each of the PSAs leads a pipe (27 and 28) respectively. Each of them splits into 2 pipes (29, 30) and (30, 31) respectively. The VOC-purified flow coming from the first PSA circulates in pipe (29) while the VOC-purified flow coming from the second PSA circulates in pipe (31). The two pipes are joined so as to form a single pipe (51) supplying the $CO_2$ purification unit (6).

In regeneration mode, the regenerating gas circulates in the pipes (30, 32). It emerges at the lower part of the PSA. Thus, a pipe (33) equipped with a valve (35) leads from the first PSA (21). A pipe (34) equipped with a valve (36) leads from the second PSA (22). Pipes (33, 34) are joined upstream of the valves (35, 36) to form a common pipe (37). This pipe is connected to the oxidation unit (10).

The first $CO_2$ purification unit (6) combines two membrane separation stages (38, 39). The membranes are selected to enable the separation of around 90% of the $CO_2$ and around 50% of the $O_2$.

The permeate loaded with $CO_2$, $O_2$ and a very small proportion of $CH_4$ coming from the first membrane separation is used to regenerate the PSAs (21, 22). It circulates in pipe (40) then alternately in pipes (30, 32) depending on the operating mode of the PSAs. The retentate from the first separation is then directed towards the second membrane separation (39). The permeate from the second membrane separation is recycled by means of a pipe connected to the main circuit upstream of the compressor (18). This step enables a gas (42) with less than 3% $CO_2$ and with a $CH_4$ yield greater than 90% to be produced.

The second $CO_2$ purification unit (7) combines 2 PTSAs (43, 44). They are loaded with zeolite-type adsorbents. They are each connected to pipes according to a model identical to that described previously for the PSAs. They also function according to a production mode or a regeneration mode. In production mode, the gas flow (42) alternately supplies the PTSAs (43, 44) by means of pipes (45, 46) each equipped with a valve (47, 48). The $CO_2$-purified gas flow from the PTSA (43) then circulates in pipe (49). The $CO_2$-purified gas flow from the PTSA (44) then circulates in pipe (50). The two pipes (49, 50) are connected to a single pipe (52) connected to the next unit.

In regeneration mode, the regenerating gas circulates in the pipes (53, 54). It emerges in the lower part of the PTSAs. Thus, a pipe (55) equipped with a valve (56) leads from the first PTSA (43). A pipe (57) equipped with a valve (58) leads from the second PTSA (44). Pipes (55, 57) are joined upstream of the valves (56, 58) to form a common pipe (59). This pipe is connected to the methane gas recovery unit (11).

The cryodistillation unit (8) is supplied by the pipe (52) in which the gas to be purified circulates. It contains 3 elements: a heat exchanger (60), a reboiler (61), a distillation column (62).

The exchanger (60) is an aluminum or stainless steel brazed-plate exchanger. It cools the gas flow (52) by thermal exchange with the flow of liquid methane (69) drawn off the distillation column (62). The gas flow (52) is partially liquefied (63). The 2-phase flow (63) ensures reboiling of the vessel reboiler (61) of the column (62) and the heat produced (64) is transferred to the column vessel (62). The flow (63) cools in the reboiler (61) and partially condenses (65). The partially condensed fluid (65) is held by means of a valve (66) at a pressure of between 0.11 and 0.5 megapascals (between 1.1 and 5 bars) absolute. The fluid then in the liquid state (67) is sent to the head of the column (62). The temperature must be greater than 90.7 K to avoid the methane solidifying.

The liquid (67) then separates in the column (62) to form a gas (68) by means of the condenser (71). The cooling of the condenser (71) is ensured by charging with liquid nitrogen coming from an external source (9). The liquid nitrogen is transformed into vaporized nitrogen (72). The gas (68) yields its cold energy in the exchanger (60) on contact with the gas flow (52) coming from the PTSAs (43, 44). The gas flow obtained (70) loaded with $CO_2$ and $O_2$ is sent to the oxidation unit (10). In the illustrated embodiment, the gas flow (70) is oxidized in a common oxidation unit (10) with the flow (37) resulting from the regeneration of the PSAs, loaded with $CO_2$, $O_2$ and VOCs. Alternatively, oxidation is carried out in separate units.

In another embodiment not shown, the $N_2$-rich distillate (68) from the cryogenic separation is mixed with the vaporized nitrogen (72) used to cool the head of the column (62) to regenerate the PTSAs.

The liquid (69) from the distillation column vessel (62) is sent to the reboiler (61) where it is partially vaporized. The gas formed (64) is sent to the column vessel (62). The remaining liquid (69) is vaporized in the exchanger (60) to form a pure methane gas (73).

In the embodiment shown, the gas flow (73) is used to regenerate the PTSAs (43, 44). The flow (73) is further preheated thanks to the heat generated by the oil cooling circuit of the compressor (18), which is transferred from the module (19) by means of a pipe (74).

According to the method illustrated, the gaseous methane is collected after regenerating the PTSAs.

Other alternatives of the method may be envisaged, notably that aiming to collect liquid methane directly from the distillation column.

The invention claimed is:

1. A facility for producing gaseous biomethane by purifying biogas from non-hazardous waste storage facilities (NHWSF), comprising:
    a compression unit for compressing an initial gas flow of the biogas to be purified;
    a volatile organic compound (VOC) purification unit arranged downstream of the compression unit to receive the compressed initial flow of the biogas and comprising at least one adsorber loaded with adsorbents capable of reversibly adsorbing VOCs to thereby produce a VOC-depleted gas flow;
    a membrane separation unit arranged downstream of the VOC purification unit to receive the VOC-depleted gas flow and subject the VOC-depleted gas flow to at least one membrane separation, wherein the membrane separation unit has 1 to 4 membrane stages of which the permeability enables more than 90% of $CO_2$ and at least 30% of $O_2$ to be separated from the VOC-depleted gas flow;
    a $CO_2$ purification unit arranged downstream of the membrane separation unit to receive a retentate from the membrane separation unit, wherein the $CO_2$ purification unit comprises at least one adsorber loaded with adsorbents capable of reversibly adsorbing the majority of remaining $CO_2$ from the retentate to produce a $CO_2$-depleted gas flow;
    a cryodistillation unit comprising a heat exchanger and a distillation column, the cryodistillation unit arranged downstream of the $CO_2$ purification unit to receive the $CO_2$-depleted gas flow and subject the $CO_2$-depleted gas flow to a cryogenic separation to separate $O_2$ and $N_2$ from the $CO_2$-depleted gas flow, wherein:
        the heat exchanger is arranged to receive the $CO_2$-depleted gas flow from the $CO_2$ purification unit to cool the $CO_2$-depleted gas flow,
        the distillation column is arranged to receive the cooled $CO_2$-depleted gas flow from the heat exchanger, wherein the distillation column separates the $CO_2$-depleted gas flow into a liquid $CH_4$ and a gas distillate,
        a first pipe connects the heat exchanger and the distillation column for flow of the cooled $CO_2$-depleted gas flow from the heat exchanger to the distillation column,
        a second pipe connects the heat exchanger and the distillation column for flow of the liquid $CH_4$ from the distillation column to the heat exchanger,
        a third pipe connects the heat exchanger and the distillation column for flow of the gas distillate from the distillation column to the heat exchanger, and
        the flow the liquid $CH_4$ and the gas distillate into the heat exchangers cools the $CO_2$-depleted gas flow by thermal exchange and as a result vaporizes the liquid $CH_4$ to form the gaseous biomethane.

2. The facility for producing gaseous biomethane by purifying biogas from non-hazardous waste storage facilities (NHWSF) according to claim 1, wherein:
    a biogas source supplies the initial gas flow of the biogas,
    the compression unit is capable of compressing the initial gas flow of the biogas to a pressure of from 0.8 MPa to 2.4 MPa,
    the VOC purification unit comprises two adsorbers loaded with adsorbents capable of reversibly adsorbing the VOCs,
    the membrane separation unit comprises two separating membrane stages capable of partially separating the $CO_2$ and the $O_2$ from the VOC-depleted gas flow, and
    the $CO_2$ purification unit comprises two adsorbers loaded with adsorbents capable of reversibly adsorbing the majority of the remaining $CO_2$ in the retentate.

3. The facility for producing gaseous biomethane by purifying biogas from non-hazardous waste storage facilities (NHWSF) according to claim 1, wherein the adsorber loaded with adsorbents capable of reversibly adsorbing the VOCs is a pressure swing adsorber (PSA) and wherein the adsorber loaded with adsorbents capable of reversibly adsorbing the majority of the remaining $CO_2$ is a pressure and temperature swing adsorber (PTSA).

\* \* \* \* \*